United States Patent [19]

Jo

[11] Patent Number: 5,508,745
[45] Date of Patent: Apr. 16, 1996

[54] APPARATUS FOR CONTROLLING A QUANTIZATION LEVEL TO BE MODIFIED BY A MOTION VECTOR

[75] Inventor: Jae M. Jo, Seoul, Rep. of Korea

[73] Assignee: Samsung Electronics Co., Ltd., Kyungki-Do, Rep. of Korea

[21] Appl. No.: 157,274

[22] Filed: Nov. 26, 1993

[30] Foreign Application Priority Data

Nov. 27, 1992 [KR] Rep. of Korea .............. 92-22671

[51] Int. Cl.⁶ .............. H04N 7/30; H04N 7/32
[52] U.S. Cl. .............. 348/419; 348/699; 348/405; 348/416
[58] Field of Search .............. 348/402, 405, 348/407, 419, 441, 469, 699, 700, 384, 390, 416; H04N 7/133, 7/137

[56] References Cited

U.S. PATENT DOCUMENTS

| | | | |
|---|---|---|---|
| 5,038,209 | 8/1991 | Hang | 348/419 |
| 5,089,888 | 2/1992 | Zderski et al. | 348/405 |
| 5,136,377 | 8/1992 | Johnston et al. | 348/419 |
| 5,144,423 | 9/1992 | Knauer et al. | 348/402 |
| 5,144,424 | 9/1992 | Savatier | 348/405 |
| 5,144,426 | 9/1992 | Tanaka et al. | 348/409 |
| 5,157,488 | 10/1992 | Pennebaker | 348/405 |
| 5,196,933 | 3/1993 | Henot | 348/419 |
| 5,210,605 | 5/1993 | Zaccarin et al. | 348/699 |
| 5,241,401 | 8/1993 | Fujiwara et al. | 348/390 |
| 5,267,037 | 11/1993 | Sugiyama | 348/384 |
| 5,294,974 | 3/1994 | Naimpally et al. | 348/405 |
| 5,301,242 | 4/1994 | Gonzales et al. | 348/384 |
| 5,317,397 | 5/1994 | Obaka et al. | 348/416 |
| 5,351,083 | 9/1994 | Tsukagoshi | 348/405 |

FOREIGN PATENT DOCUMENTS

| | | | |
|---|---|---|---|
| 2081233 | 4/1993 | Japan | H04N 7/137 |
| 8705179 | 8/1987 | United Kingdom | H04N 7/137 |

*Primary Examiner*—Tommy P. Chin
*Assistant Examiner*—Vu Le
*Attorney, Agent, or Firm*—Sughrue, Mion, Zinn, Macpeak & Seas

[57] ABSTRACT

A motion vector calculating device receives horizontal and vertical components of a motion vector and calculates the magnitude of the motion vector. A motion estimating device then compares the magnitude of the motion vector with stored reference values. A quantization level modifying device in turn provides a real quantization level signal taking into consideration man's visual perception characteristic and the fullness of a buffer in the data transmission path. Accordingly, the quantization level is enhanced for larger moving parts of the picture while the quantization level is reduced for parts of the picture containing less motion, thereby allowing the signal being quantized to be further compressed.

11 Claims, 4 Drawing Sheets

APPARATUS FOR CONTROLLING A QUANTIZATION LEVEL TO BE MODIFIED BY A MOTION VECTOR

BACKGROUND OF THE INVENTION

1. Field of the Invention

The present invention relates to an apparatus for processing a picture signal, and particularly to an apparatus for controlling a quantization level to be modified by a motion vector of pictures.

2. Brief Discussion of the Related Art

Recently, in order to enhance picture quality, there have been used well-known circuit in order to code a picture signal into digital data. However, in the case where the picture signal is coded into digital data form, a large volume of data should be coded. Accordingly, efficient compression of data is required.

Data compression is performed using various redundancy factors in the picture data so that data is included in a given band, in various systems such as HD-VCR, digital VCR, digital camcorder, HD-TV and video phone, etc. An intra frame coding and an inter frame coding methods for eliminating the redundancy data are known.

FIG. 1 is a block diagram illustrating a conventional coding apparatus for coding a picture signal into digital data. Referring to FIG. 1, a pre-filter 10 allows a low frequency signal to be passed, and reduces a high frequency signal to take advantage of the fact that man's visual characteristic is more sensitive to a low frequency than a high frequency. A motion vector detector 12 calculates the difference between a frame-delayed picture signal in a frame memory 32 and a picture signal input from the pre-filter 10 and outputs it. That is, the motion vector detector 12 calculates motions between a picture block within a present frame and a corresponding picture block within a previous frame as horizontal and vertical components MVH and MVV, and outputs them. At this time, the motion vector detector 12 detects the motions between the present frame and the previous frame in a macroblock unit shown in FIG. 2. In FIG. 2, the macroblock is composed of 16×16 or 32×16 pixels. A motion compensation unit 14 compensates the picture information of the previous frame stored in the frame memory 32 according to the motion vector components MVH and MVV, which are detected from the motion vector detector 12. A first adder 16 receives the picture signal of the present frame which is output from the pre-filter 10 and has the high frequency component than that of the previous frame which is motion-compensated in the motion compensation unit 14, and generates a difference value between two signals. A Discrete Cosine Transform DCT 18 performs a DCT in a block unit of 8×8 pixels for the signal generated from the first adder 16. When the picture signal of a spatial domain is transformed into a frequency domain by the DCT, the picture signals, in general, are distributed close to the low frequency domain. A quantizer 20 quantizes the picture signal transformed in the DCT 18 according to a predetermined quantization level. The quantized picture signal is zigzag-scanned by a run length coder (not shown), and is represented by a pair of sequential numbers of '0' level and level not '0. For one example, when a level of a quantized first signal is '10', the run length coded signal is represented as "(0,10)". Also, if a signal level of '5' follows two signal levels of '0' after a signal level of '10', the run length coded signal is expressed by "(2,5)".

Run length coded signal includes an End of Bit. A variable-length coder 22 compresses the quantized and run length coded picture signal. That is, a large number data among signal levels (0~255 levels) represented by 8 bits is denoted by a number of small bits, while a small number of data is represented by a number of large bits, thereby the total bits to denote the picture signal is decreased. Generally, in the case where run length coding is performed after quantizing the discrete cosine transformed picture signal, there are a large number of signal levels representing '0' and a small number of large signal levels. Accordingly, '0' is represented by small bits, while 255 is denoted by large bits, and therefore the total number of bits is reduced. Since the data length which is compressed and output in the variable-length coder 22 is not constant, a buffer 24 stores temporary data and outputs it at a constant rate. Then, the buffer 24 determines the quantization level with respect to the fullness and outputs a quantization level signal to the quantizer 20. That is, in the case where the fullness of the buffer is high, a high quantization level makes the data amount for coding decrease. While the fullness is low, a low quantization level allows the data for coding to be increased. The quantization level is, in a slice unit, determined as shown in FIG. 2.

An inverse quantizer 26 reproduces the picture signal quantized in the quantizer 20 to an original signal prior to quantizing. An inverse DCT (IDCT) 28 reproduces the output signal of the inverse quantizer 26 to reproduce the picture signal prior to performing the discrete cosine transform DCT. A second adder 30 adds the output signal of the inverse DCT 28 and that of the motion compensation unit 14. Therefore, the output of the second adder 30, which is similar to a picture signal before adding it to the output signal of the motion compensation unit 14 by the first adder 16, is input to a frame memory 32. When a picture signal of the following frame is input to the pre-filter 10, the input signal becomes a pictures signal of the present frame. On the other hand, the picture signal to the frame memory 32 becomes that of the previous frame. The above operation is repeatedly performed.

In the system described above, since the quantization level of the quantizer 20 is controlled solely by the fullness of the buffer, there have been limitations in enhancing the efficiency of data compression.

SUMMARY OF THE INVENTION

In order to solve the above problem, it is an object of the present invention to provide an apparatus for controlling a quantization in response to or modified by a motion vector so that the compression efficiency of data can be enhanced using man's visual characteristic, which is less sensitive to picture quality in larger moving parts of the picture.

The object of the present invention is accomplished by an apparatus for controlling a quantization level, in which controls a quantization level of motion-compensated picture data between adjacent frames according to the fullness of a buffer in data transmission at a constant rate. The apparatus comprises means for calculating a magnitude of a motion vector to be input; means for estimating the motion degree of picture blocks according to the motion vector magnitude output from the vector magnitude calculating means; and means for modifying a quantization level, which stores man's visual characteristic information in response to a picture motion, receives both the quantization level determined by the fullness of the buffer and the motion degree of picture blocks by the motion estimating means, and generates a real quantization level determined with respect to man's visual characteristic information and the fullness of the buffer.

BRIEF DESCRIPTION OF THE DRAWINGS

The objects and features of the present invention will now become more apparent from the consideration of the following detailed description taken in conjunction with the accompanying drawings in which.

DETAILED DESCRIPTION OF THE PREFERRED EMBODIMENTS

The preferred embodiments of the present invention will be described below with reference to the accompanying drawings.

Figure 1:
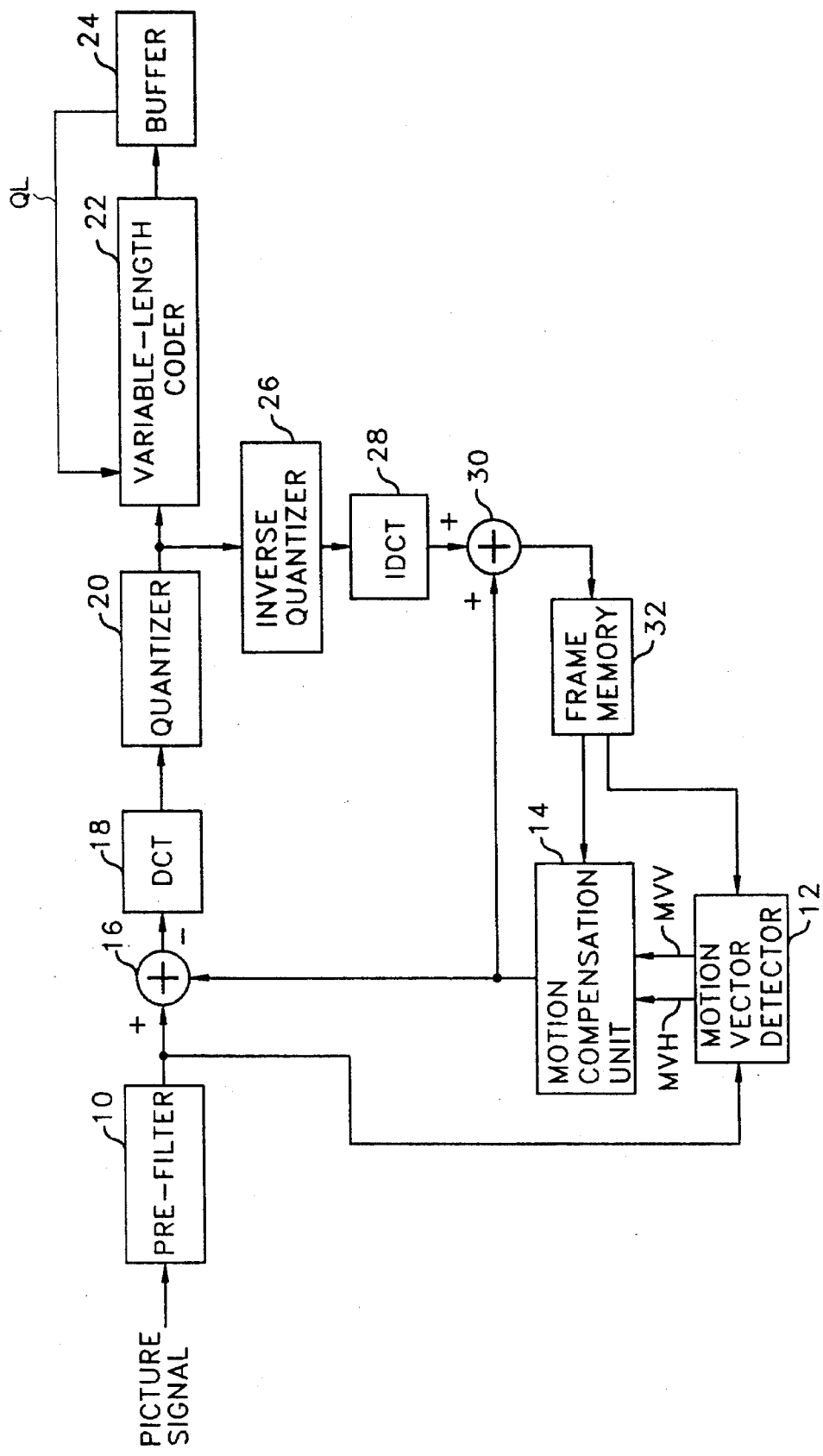
FIG. 1 is a block diagram illustrating a conventional coding apparatus for coding a picture signal into digital data.
Figure 2:
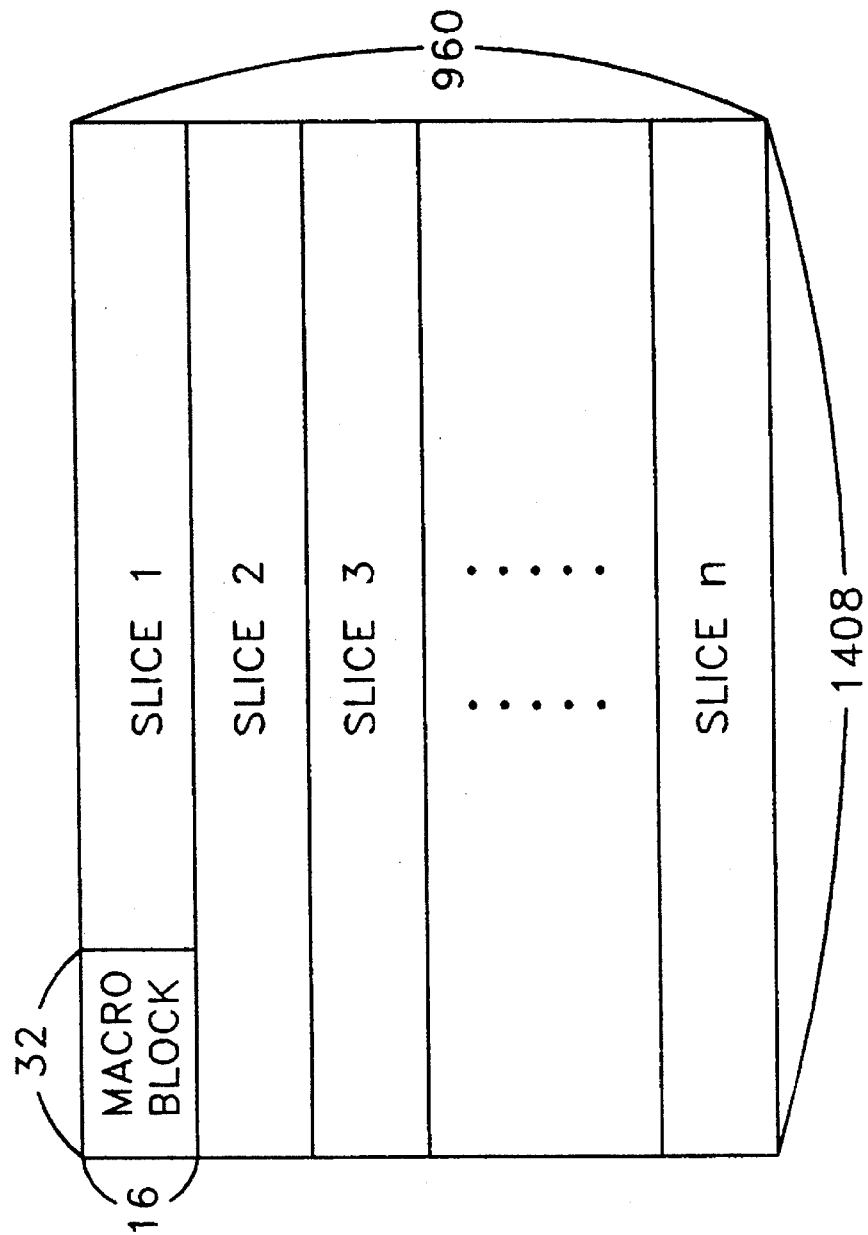
FIG. 2 is a conceptual view showing slices and macroblocks of a picture frame.
Figure 3:
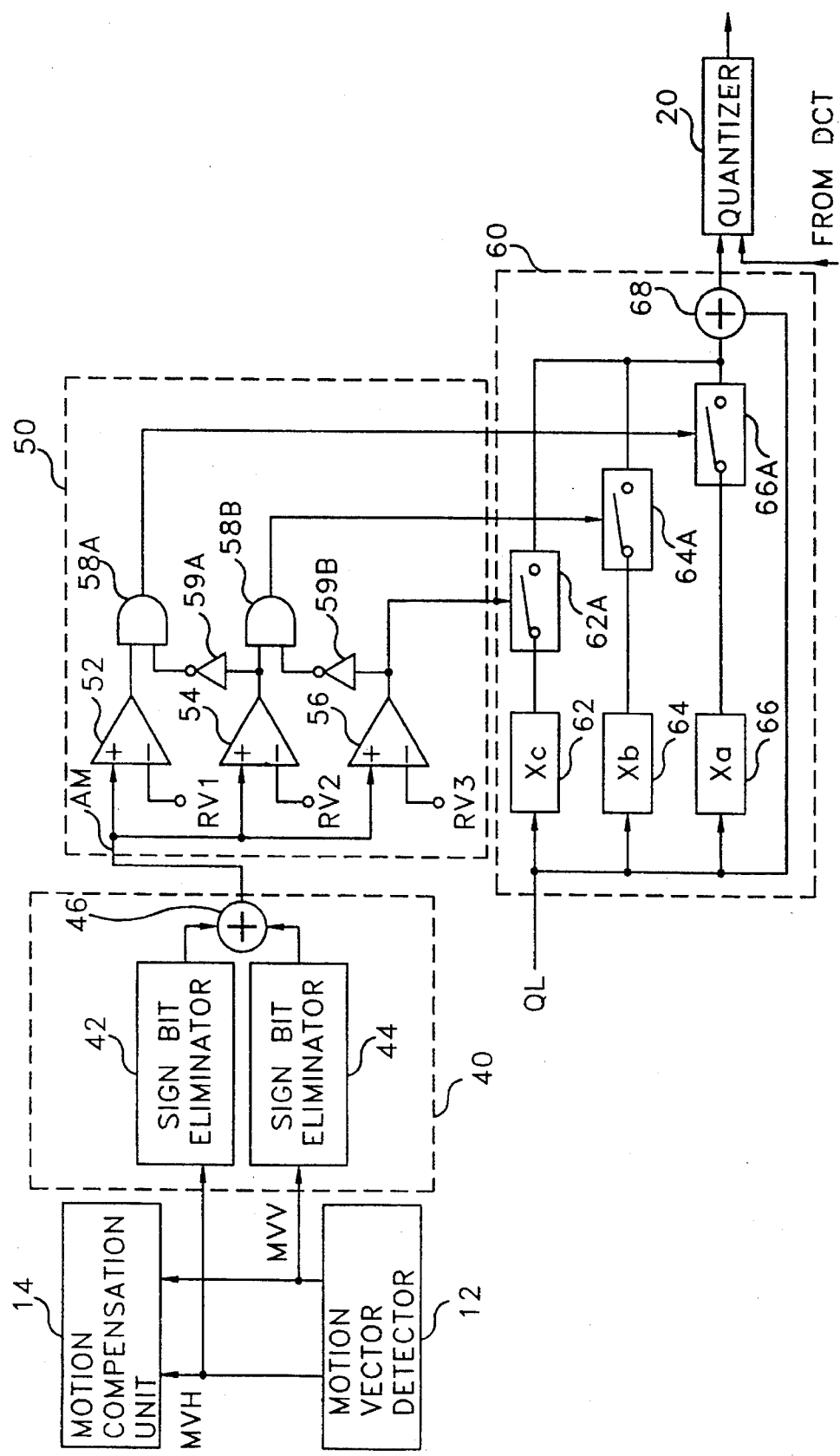
FIG. 3 is a block diagram illustrating one preferred embodiment of an apparatus for controlling a quantization level modified by a motion vector in accordance with the present invention.

FIG. 3 is a block diagram illustrating an apparatus for controlling a quantization level modified by a motion vector in accordance with the present invention. Referring to FIG. 3, a horizontal component MVH and a vertical component MVV of a motion vector output from a motion vector detector 12 are input to a vector magnitude calculator 40. The vector magnitude calculator 40 comprises first and second sign bit eliminators 42 and 44, and a first adder 46. The first sign bit eliminator 42 eliminates code bits in response to the horizontal component MVH of the motion vector, and the second sign bit eliminator 44 eliminates code bits in response to the vertical component MVV of the motion vector. Here, the elimination of the code bits is performed to obtain an absolute value of each of the vector components. Signals from which the code bits are eliminated by the first and second sign bit eliminators 42 and 44 are added in the first adder 46. The first adder 46 supplies adding magnitudes AM of the vector components to a motion estimator 50 connected to its output terminal.

The motion estimator 50 comprises first, second and third comparators 52, 54, and 56 for comparing input signals with reference values RV1, RV2 and RV3, respectively. In each of these comparators, an inverting input receives the respective reference values, while the non-inverting input receives the external input signal AM. The above reference values satisfy the relationship "RV1<RV2<RV3" in each level. Each of signal outputs of the first and second comparators 52 and 54 are separately connected to respective first and second AND gates 58A and 58B. A first inverter 59A connects the signal output of the second comparator 54 to a signal input of the first AND gate 58A. A second inverter 59B connects a signal output of the third comparator 56 with a signal input of the second AND gate 58B.

A first quantization level modifier 60 multiplies weighting coefficients relating to the picture motion, by a quantization level QL to be input and outputs it. The quantization level modifier 60 comprises multipliers 62, 64 and 66, switches 62A, 64A and 66A, and a second adder 68. A first switch 62A receives a binary signal from the third comparator 56 as a switching control signal. A second switch 64A receives a binary signal from the second AND gate 58B as a switching control signal. A third switch 66A is connected to receive a binary signal from the first AND gate 58A as a switching control signal. The first, second and third multipliers 62, 64 and 66 are separately connected to each of signal inputs of first, second and third switches 62A, 64A and 66A. The second adder 68 adds the quantization level QL, which determined by the fullness of a buffer and the signals output from the switches 62A, 64A and 66A, and supplies the output signal to a quantizer 20.

The adding magnitude AM output from the vector magnitude calculator 40 is input to the first motion estimator 50, and its level is compared by the comparators 52, 54 and 56. The binary signals output from the first motion estimator 50 as a result of level comparison are used to control the operation of switches 62A, 64A and 66A in the first quantization level modifier 60. For example, in the case where the adding magnitude AM output from the first adder 46 is smaller than the first reference value RV1, all the outputs of the comparators 52, 54 and 56 become low level signals. Since the output of the comparators are all low, the output signals of the first and second AND gates 58A and 58B and the third comparator 56 are all low level signals.

On the other hand, when the quantization level QL determined by the fullness of the buffer is input to the quantization level modifier 60, the multipliers 62, 64 and 66 multiply the stored weighting coefficients by the quantization level QL and output their respective values. The levels between weighting coefficients in the multipliers satisfy the relationship of "C>B>A". One signal among the signals output from the multipliers is input to a respective switch under a "switch" condition responsive to the first motion estimator 50. The input signal is supplied to the second adder 68, and added to the quantization level QL determined by the fullness of the buffer. A real quantization level RQL is output from the second adder 68 and supplied to the quantizer 20. It will be appreciated that the weighting coefficients represent human visual characteristics information.

Figure 4:
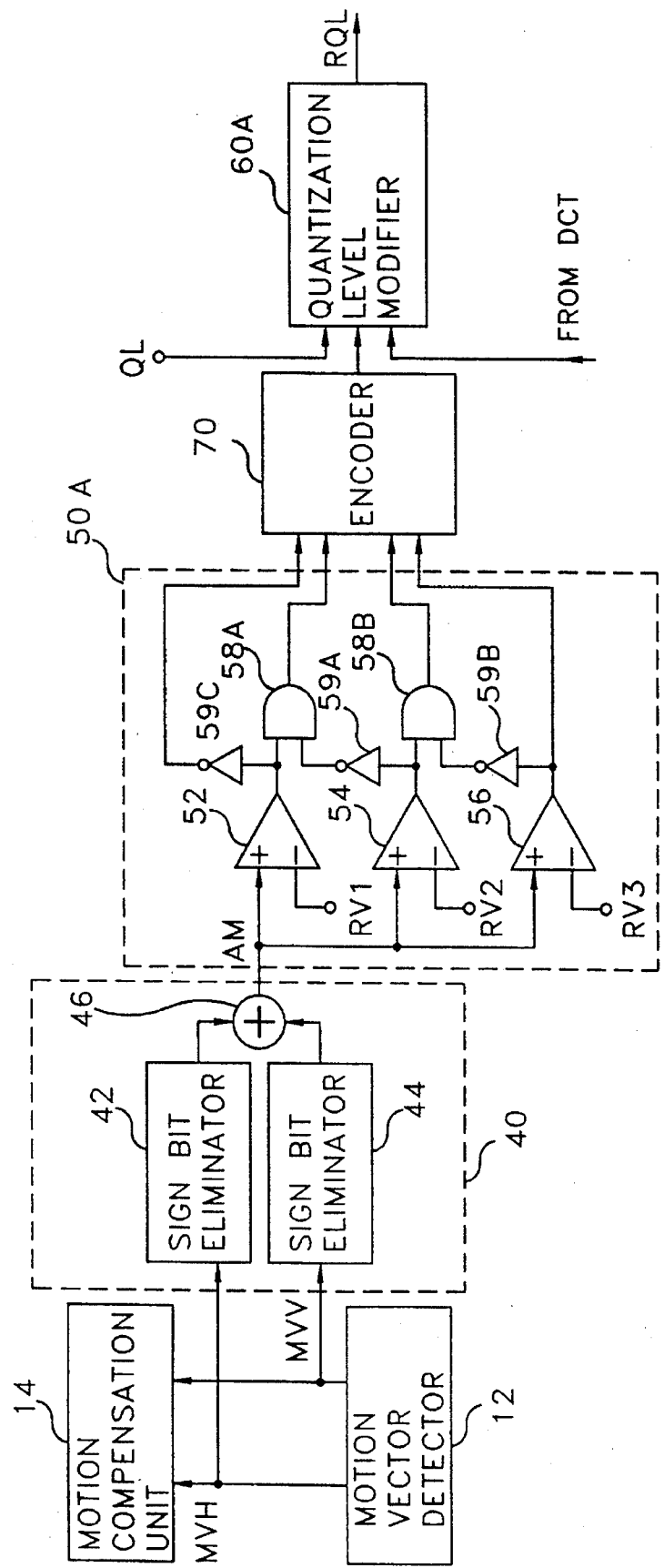
FIG. 4 is a block diagram illustrating another preferred embodiment of an apparatus for controlling a quantization level modified by a motion vector in accordance with the present invention.

FIG. 4 is a block diagram illustrating another preferred embodiment of an apparatus for controlling a quantization level to be modified by a motion vector in accordance with the present invention. Referring to FIG. 4, a vector magnitude calculator 40 has a function equivalent to that of the calculator 40 in FIG. 3, and equal codes are generated. A motion estimator 50A is similar to estimator 50 in FIG. 3 and further comprises an inverter 59C, connected to the output of the first comparator 52 of the first motion estimator 50 in FIG. 3. An encoder 70, coupled to the second motion estimator 50A, functions by encoding the four signal outputs from the second motion estimator 50A into 2-bit signals. A signal output of the encoder 70 is connected to a second quantization level modifier 60A. The second quantization modifier 60A stores quantization levels in consideration of man's visual characteristic in response to picture motion and the fullness of a buffer, and reads out corresponding quantization levels which are stored as an address determined by the quantization level based on the signal output from the encoder 70 and the fullness of the buffer. A real quantization level RQL output from the second quantization level modifier 60A is supplied to the quantizer 20 and utilized in regulating a signal amount to be quantized.

Since the above embodiments are not intended to limit the present invention, those of ordinary skill in the art will recognize various modifications of the embodiments described above, which are all within art category of the present invention.

The apparatus for controlling a quantization level in accordance with the present invention utilizes man's visual characteristic, i.e., different sensitivity to picture quality according to the degree of picture motion. The quantization level is enlarged for larger moving parts of the picture, and the quantization level is reduced for parts of the picture exhibiting less motion, allowing the signal amount to be quantized to be further compressed.

I claim:

1. An apparatus for controlling a quantization level of motion-compensated picture data between adjacent frames of a video signal encoder including a motion vector detector generating a motion vector and a data transmission path having a quantizer, controlled by a real quantization level signal, serially coupled to a buffer generating a quantization level signal according to the fullness of a buffer thereby facilitating data transmission at a constant rate, the apparatus comprising:

means for calculating a magnitude of the motion vector;

means for estimating a motion degree signal for picture blocks according to the respective motion vector magnitude output from said calculating means; and means for modifying said quantization level signal in accordance with human's visual characteristic information in response to picture motion, said modifying means receiving both said quantization level signal determined by said fullness of the buffer and the motion degree signal of picture blocks produced by said motion estimating means, and for generating the real quantization level signal determined by human's visual characteristic information and said fullness of the buffer.

2. The apparatus as claimed in claim 1, wherein said calculating means comprises:

a first sign bit eliminator receiving horizontal component data of said motion vector and eliminating first sign bits;

a second sign bit eliminator receiving vertical component data of said motion vector and eliminating second sign bits; and a first adder for adding data output from each of said first and said second sign bit eliminators.

3. The apparatus as claimed in claim 1, wherein said motion estimating means further comprises means for applying a plurality of first reference values in order to compare the motion degree signal of said picture blocks with said motion vector magnitudes, and means for generating a control signal corresponding to the result of magnitude comparison between said reference values and said motion vector magnitude.

4. The apparatus as claimed in claim 3, wherein said quantization level modifying means comprises:

a plurality of multipliers for storing said human's visual characteristic information as weighting coefficients, and for multiplying and for outputting a received quantization level signal in response to said fullness of the buffer and each of said weighting coefficients stored therein;

a second adder for adding output signals of said multipliers to the quantization level signal based on said fullness of the buffer; and a plurality of switches, coupled to respective signal outputs of said multipliers, for selecting a signal to be supplied from said multipliers to said second adder in response to said control signal.

5. The apparatus as claimed in claim 1, wherein said motion estimating means comprises means for generating a control signal having a predetermined number of bits and wherein said quantization level modifying means comprises means for reading out corresponding quantization levels which are stored at respective addresses associated with the quantization level signal in response to said control signal and said fullness of the buffer and thereby generates said real quantization level signal.

6. A method for operating an apparatus controlling a quantization level of motion-compensated picture data between adjacent frames in a video signal encoder having a motion vector detector generating an motion vector and a transmission path serially coupling a quantizer using a real quantization level signal and a buffer generating a quantization level signal according to the fullness of the buffer to maintain the transmission at a constant rate, said method comprising the steps of:

(a) calculating magnitude of the motion vector to thereby determine motion vector magnitude;

(b) estimating a motion degree signal for picture blocks according to said motion vector magnitude generated during step (a);

(c) modifying the quantization level signal indicative of said fullness of the buffer responsive to stored data corresponding to human's visual perception characteristics and to said motion degree signal; and (d) generating a real quantization level signal in response to said characteristics and said fullness of the buffer.

7. The method as claimed in claim 6, wherein said step (a) comprises the steps of:

(e) eliminating at least one sign bit from a received horizontal component of said motion vector to produce first data;

(f) eliminating at least one sign bit from a received vertical component of said motion vector to produce second data; and (g) adding said first data to said second data to thereby generate said motion vector magnitude.

8. The method as claimed in claim 6, wherein said step (b) comprises the steps of:

(h) comparing said motion vector magnitude with a plurality of reference values; and (i) generating a control signal corresponding to a respective result of magnitude comparison between said reference values and said motion vector magnitude.

9. The method as claimed in claim 8, wherein said step (c) comprises the steps of:

(j) multiplying said quantization level signal by a plurality of coefficients, wherein each of said coefficients corresponds to one of said reference values, to produce a respective plurality of quantization level modified signals: and (k) selecting one of said modified signals responsive to said motion degree signal.

10. The method as claimed in claim 9, wherein said step (d) comprises the step of (l) adding the selected one of said modified signals to said quantization level signal to thereby produce said real quantization level signal.

11. The method as claimed in claim 6, wherein said step (b) comprises the steps of:

(m) comparing a plurality of reference values with said motion vector magnitude generated during step (a) to produce a plurality of comparator outputs;

(n) encoding control signals in response to said outputs so as to produce said motion degree signal.

* * * * *